US009604178B1

(12) United States Patent
Bharwada et al.

(10) Patent No.: US 9,604,178 B1
(45) Date of Patent: Mar. 28, 2017

(54) INTEGRATED OSMOSIS SYSTEMS AND METHODS

(71) Applicants: Upen Jayant Bharwada, Scottsdale, AZ (US); Kenneth R. Ward, Tempe, AZ (US)

(72) Inventors: Upen Jayant Bharwada, Scottsdale, AZ (US); Kenneth R. Ward, Tempe, AZ (US)

(73) Assignee: Upen Jayant Bharwada, Scottsdale, AZ (US)

(*) Notice: Subject to any disclaimer, the term of this patent is extended or adjusted under 35 U.S.C. 154(b) by 0 days.

(21) Appl. No.: 15/185,528

(22) Filed: Jun. 17, 2016

Related U.S. Application Data

(60) Provisional application No. 62/323,754, filed on Apr. 17, 2016.

(51) Int. Cl.
*B01D 61/02* (2006.01)
*B01D 61/10* (2006.01)
(Continued)

(52) U.S. Cl.
CPC ........... *B01D 61/58* (2013.01); *B01D 61/002* (2013.01); *B01D 61/005* (2013.01);
(Continued)

(58) Field of Classification Search
CPC .... B01D 61/002; B01D 61/005; B01D 61/02; B01D 61/022; B01D 61/025;
(Continued)

(56) References Cited

U.S. PATENT DOCUMENTS 3,085,083 A 4/1963 Schreyer
3,721,621 A 3/1973 Hough
(Continued)

OTHER PUBLICATIONS

"Desalination by forward osmosis: Identifying performance limiting parameters though module-scale modeling;" Elsevier Journal of Membrane Science 491 (2015) 159-167.
(Continued)

*Primary Examiner* — Joseph Drodge
(74) *Attorney, Agent, or Firm* — Law Offices of Damon L. Boyd, PLLC

(57) ABSTRACT

Integrated, sequential stages of nanofiltration, forward osmosis, and reverse osmosis and related membranes provide an Integrated Osmosis structure, systems and methods. By optimally placing and using the desired characteristics of each membrane, performance and cost effectiveness not attainable individually is obtained. Integrated Osmosis systems provide high diffusive and osmotic permeability, high rejection, low power consumption, high mass transfer, and favorable Peclet number, by manipulating convection, advection and diffusion, low concentration polarization gradients, low reverse salt flux and effective restoration of performance after cleaning fouled membranes. Benefits include increased permeate recovery and decreased waste concentrate volume from reverse osmosis processes or other elevated osmotic pressure solutions. Integrated Osmosis first employs nanofiltration for selective harvesting of solutes, proffering a reduced osmotic pressure permeate. Forward osmosis dewaters the lowered osmotic pressure permeate generating a dilute draw solution which serves as feed to a reverse osmosis process. Reverse osmosis permeate provides freshwater and concentrate provides draw solution for the forward osmosis process.

12 Claims, 9 Drawing Sheets

(51) Int. Cl.
*B01D 61/12* (2006.01)
*B01D 61/30* (2006.01)
*B01D 61/32* (2006.01)
*C02F 1/44* (2006.01)
*B01D 61/58* (2006.01)
*B01D 61/00* (2006.01)
*C02F 9/00* (2006.01)
*B01D 63/10* (2006.01)
*B01D 61/20* (2006.01)
*C02F 103/08* (2006.01)

(52) U.S. Cl.
CPC ......... *B01D 61/022* (2013.01); *B01D 61/027* (2013.01); *B01D 61/10* (2013.01); *B01D 61/20* (2013.01); *B01D 63/10* (2013.01); *C02F 1/441* (2013.01); *C02F 1/442* (2013.01); *C02F 1/445* (2013.01); *C02F 9/00* (2013.01); *B01D 2311/103* (2013.01); *B01D 2323/08* (2013.01); *C02F 2103/08* (2013.01)

(58) Field of Classification Search
CPC ...... B01D 61/027; B01D 61/04; B01D 61/06; B01D 61/10; B01D 63/10; B01D 63/12; B01D 2323/08; B01D 61/12; B01D 61/30; B01D 61/32; B01D 61/58; B01D 2311/10; B01D 2311/103; B01D 2313/38; C02F 1/44; C02F 1/441; C02F 1/442; C02F 1/445; C02F 9/00; C02F 2103/08
USPC ............ 210/321.74, 321.76, 321.83, 321.85, 210/321.72
See application file for complete search history.

(56) References Cited

U.S. PATENT DOCUMENTS

| | | | |
|---|---|---|---|
| 9,206,061 B1 | 12/2015 | Harris | |
| 2005/0145568 A1 | 7/2005 | McGinnis | |
| 2006/0144789 A1 | 7/2006 | Cath | |
| 2007/0131610 A1* | 6/2007 | Peng ................. | B01D 67/0088 210/500.27 |
| 2009/0297431 A1 | 12/2009 | McGinnis | |
| 2012/0037566 A1* | 2/2012 | Achilli ................ | B01D 61/002 210/652 |
| 2012/0267307 A1* | 10/2012 | McGinnis ............ | B01D 61/002 210/638 |
| 2012/0267308 A1* | 10/2012 | Carmignani ......... | B01D 61/002 210/644 |
| 2013/0032538 A1* | 2/2013 | Iyer ......................... | C02F 1/445 210/648 |
| 2013/0075335 A1* | 3/2013 | Prakash .................. | C02F 1/463 210/640 |
| 2014/0224718 A1* | 8/2014 | Hancock ............... | B01D 61/58 210/195.2 |
| 2014/0263025 A1* | 9/2014 | Maxwell ............. | B01D 69/148 210/321.74 |
| 2015/0014248 A1* | 1/2015 | Herron ................. | B01D 61/58 210/641 |
| 2015/0048272 A1* | 2/2015 | Rai ......................... | C09K 5/10 252/75 |

OTHER PUBLICATIONS

"Effect of draw solution concentration and operating conditions on forward osmosis and pressure retarded osmosis performance in a spiral wound module;" Elsevier Journal of Membrane Science 348 (2010) 298-309.

"Raising forward osmosis brine concentration efficiency through flow rate optimization;" Elsevier Journal of Membrane Science 366 (2015) 71-79.

"Effect of molecular weight of PEG on membrane morphology and transport properties;" Elsevier Journal of Membrane Science 309 (2008) 209-221.

"Hydrophilic, semipemeable membranes fabricated with poly(ethylene oxide)-polysulfone block copolymer;" Elsevier Biomaterials 21 (2000) 725-733.

"Properties-performance of thin film composite membrane: study on trimesoyl chloride content and polymerization time;" Elsevier Journal of Membrane Science 255 (2005) 67-77.

"Effects of Transmebrane Hydraulic Pressure on Performance of Forward Osmosis Membranes;" Environ. Sci. Technol. 2013, 47, 2386-2393.

"Modeling of a forward osmosis and a pressure-retarded osmosis spiral wound module using the Spiegler-Kedem model and experimental validation;" Elvesier Separation and Purification Technology 164 (2016) 182-197.

"Applications of positron annihilation to membranes;" Poster 2007.

"Investigation of nanopores in nanofiltration membranes by slow positron beam techniques;" lecture from 2010.

"Technology Evaluation for Zero Liquid Discharge at a Combined Cycle Power Plant with an Air Cooled Condenser;" presented at International Water Conference, 2011.

* cited by examiner

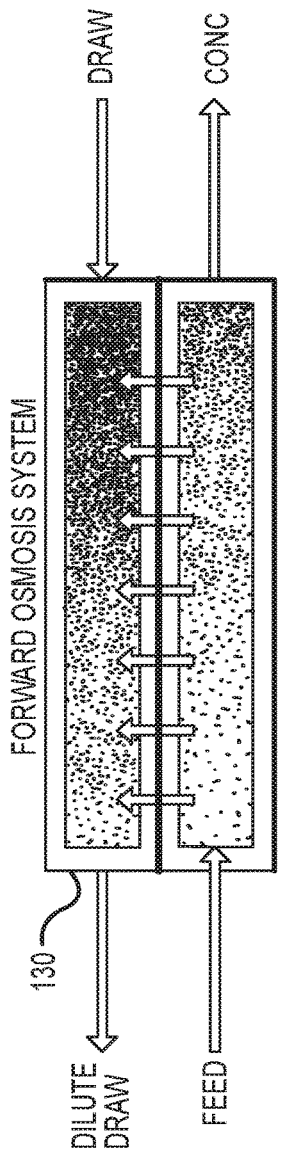

MASS BALANCE

| DESCRIPTION | UNITS | 1<br>SWRO REJECT<br>(TFC NF FEED) | 2<br>TFC NF<br>REJECT | 3<br>TFC NF<br>PERM<br>FO FEEDS | 4<br>FO<br>REJECT | 5<br>FO PERM<br>(TFC NF FEED)<br>(DEFAULT DRAW) | 6<br>RECOVERED<br>OSMOLYTE<br>(CONC DRAW) | 7<br>FINISHED<br>WATER |
|---|---|---|---|---|---|---|---|---|
| Flowrate | CuM/day | 55,000 | 16,500 | 38,500 | 7,700 | 46,200 | 15,477 | 38,000 |
| TDS | ppm | 65,356 | 25,752 | 39,604 | 198,020 | 1,980 | 1,941 | 40 |
| Na | ppm | 20,384 | 6,650 | 13,734 | 68,671 | 687 | 673 | 14 |
| K | ppm | 673 | 208 | 465 | 2,323 | 23 | 23 | 0 |
| Ca | ppm | 728 | 483 | 245 | 1,226 | 5 | 5 | 0 |
| Mg | ppm | 2,548 | 1,686 | 862 | 4,310 | 17 | 17 | 0 |
| Cl | ppm | 35,945 | 12,154 | 23,191 | 115,955 | 1,160 | 1,136 | 23 |
| SO4 | ppm | 4,823 | 3,830 | 993 | 4,964 | 20 | 19 | 0 |
| HCO3 | ppm | 255 | 141 | 114 | 570 | 6 | 6 | 0 |
| OSMOLYTE | ppm | | | | | TBD | TBD | TBD |

| Foot Print | SqFt | 36,654 |
|---|---|---|
| Total Power | KW | 10,742 |
| Specific Energy | KW-Hr/CuM | 5.8 |

FIG.4A

INTEGRATED OSMOSIS SYSTEMS AND METHODS

CROSS-REFERENCE TO RELATED APPLICATIONS

This application claims priority from U.S. Provisional Patent Application Ser. No. 62/323,754 which was filed on Apr. 17, 2016, and is incorporated herein by reference in its entirety.

FIELD OF INVENTION

The present disclosure relates to fresh water recovery systems and methods, and more specifically, to reverse and forward osmosis, nanofiltration, and other filtration processes and structures, and related systems and methods.

BACKGROUND OF THE INVENTION

From the late-1940s through the mid-1970s, the demand for ion exchange resins grew by high single digits. However, by the mid-1970s, polymeric membranes had eclipsed ion exchange in growth rates, causing the growth of ion exchange technology to decline to low single digits. This was strongly influenced by the more aggressive growth of Reverse Osmosis (RO) and partially catalyzed by RO companies promoting the lack of a third stream of regenerant chemicals causing more pollution. Thus, RO became a billion dollar industry with global acceptance as the best value. However, this growth generated awareness of new issues, including that of the concentrates or rejects from RO being discharged into the ocean at double the feed salinity. RO companies who used to claim an advantage over ion exchange because they did not generate a third regenerant chemical stream thus found the new issue of what to do about their second stream and the carbon foot print.

Moreover, the growth of RO technology diverted research and development of other water treatment technologies, notably Forward Osmosis (FO) and Nanofiltration (NF) technologies. As such, presently, over eighty percent of the world's desalination capacity is based on RO technology. Substantial investments of capital, engineering and marketing provided the foundation for this rapid and widespread growth. In addition to affording the basic chemistry and material science research, these investments further conferred development of precise, automated and reliable manufacturing processes and equipment as well as associated analytical, modeling and optimal design software technologies.

However, physical and technical limits to the applicability and performance of RO has inhibited performance gains as RO technology has matured. In this regard, various impediments limit future performance advances of the technology. For example, though increases in the percentage of freshwater recovery (permeate) are desirable, with conventional RO technology alone, in high salinity waters, the recovery tends to top out at about 42% (with about 58% reject/concentrate) at salinities of approximately 65,000 parts per million (ppm), which approaches a thermodynamic limit of 45% recovery (55% reject/concentrate) or 1.8 cycles of concentration at similar salinities.

If the status quo is maintained with respect to seawater desalination process technology, by 2030, 65 billion gallons per day (23 trillion gallons per year) of high salinity (>65,000 ppm TDS) discharge will find its way to the oceans. Without adjacent space process technologies to flank SWRO membranes, the thermodynamic factor is an anchor as is the limiting inflection point of the 'S' curve of RO membranes, a product that cannot be much improved as it is already at or near its peak performance. Moreover, concern over the lack of environment friendly options and ever rising volume and salinity continues to grow. Additionally, existing zero liquid discharge technologies of evaporation and crystallization are typically too expensive to be practical.

Accordingly, systems and methods which can increase the recovery rate of fresh water from otherwise undesirable water, as well as provide additional uses for the by-products and/or wastewater of such systems and methods are desirable. The present disclosure addresses these needs and other limitations of the prior art.

SUMMARY OF THE INVENTION

In accordance with various embodiments, the present disclosure provides integrated, sequential stages of nanofiltration, forward osmosis, and reverse osmosis, as well as related membranes to provide Integrated Osmosis systems. By optimally placing each membrane based on its most desirable characteristics, performance and cost effectiveness not otherwise attainable individually can be obtained by the system. Integrated Osmosis systems as described herein may provide high diffusive and osmotic permeability, high rejection, low power consumption, high mass transfer, favorable Peclet number, low concentration polarization gradients, low reverse salt flux and effective restoration of performance after cleaning fouled membranes. Benefits include increased permeate recovery and decreased waste concentrate volume from RO processes or other elevated osmotic pressure solutions.

As described herein, Integrated Osmosis first employs nanofiltration for selective harvesting of solutes, creating a lowered osmotic pressure permeate. Next, FO dewaters the lowered osmotic pressure permeate, generating a dilute draw solution which can serve as feed to a reverse osmosis process. RO permeate provides freshwater, and concentrate provides draw solution for the FO process. Thus, Integrated Osmosis is in essence a bridge between reverse osmosis and thermal technologies taking a RO process concentrate salinity from approximately 60,000 ppm to approximately 220,000 ppm thereby significantly improving the affordability of thermal technology to achieve ZLD (zero liquid discharge)

BRIEF DESCRIPTION OF THE DRAWINGS

The exemplary embodiments of the present disclosure will be described in conjunction with the appended drawing figures in which like numerals denote like elements and:

FIG. 4A illustrates a flow diagram and table of an FO stage of an Integrated Osmosis process;

DETAILED DESCRIPTION

Figure 1:
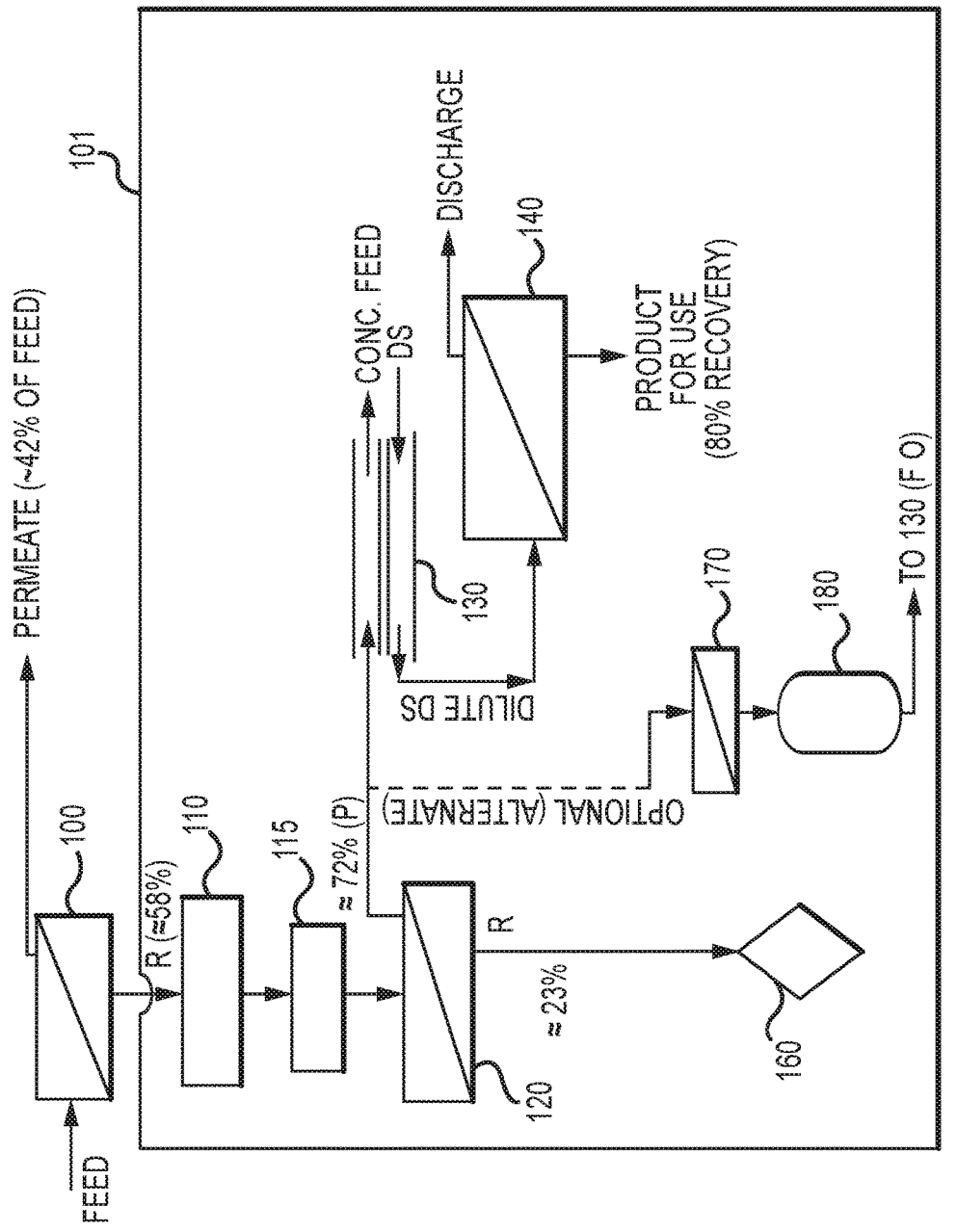
FIG. 1 illustrates a flow diagram of an Integrated Osmosis process.

The present disclosure relates to systems and methods which can increase the recovery rate of fresh water from otherwise undesirable water, as well as provide additional uses for the by-products and/or wastewater of such systems and methods. One skilled in the art will appreciate that various aspects of the disclosure may be realized by any number or type of structures and systems, as well as various types of undesirable water. For example, much of the present disclosure finds utility in the desalinization of seawater. However, one skilled in the art will appreciate that other water which has varying contaminants may likewise be found to be treatable in accordance with the present disclosure, and as such, this disclosure should not be considered to be limited to desalination alone. Moreover, while various membranes and filtration materials may be disclosed herein, those skilled in the art will appreciate that depending on the applications at hand, alternative materials, membranes, filters, and the like, as well as other structures, may likewise be suitable and fall within the scope of the present disclosure, even where not expressly recited.

It should also be noted that the drawings herein are not all drawn to scale, but may be exaggerated to illustrate various aspects of the disclosure, and in that regard, the drawings should not be limiting. Additionally, those items disclosed herein may be described herein in terms of functional block components, optional selections and various steps. It should be appreciated that such functional blocks may be realized by any number of components configured to perform the specified functions.

Overview

The present disclosure provides various levels of increased fresh water recovery percentages above those presently attainable by current RO only technology. Specifically, by integrating existing RO technology and systems with Forward Osmosis (FO) technology and nanofiltration (NF) technology, such recovery increases are attainable. In this regard, by combining the optimal performance properties of multiple technologies in a particular order, for example, RO, NF, and FO, such recovery increases may be obtained. In other words, by exploiting the best characteristics each of RO, NF, and FO, the inherent ceiling of RO can be improved, with recoveries well beyond ROs thermodynamic limit of 1.8 cycles of concentration. Such integration is referred to herein as "Integrated Osmosis" or "IO." For example, a comparison of conventional two-pass SWRO to IO is shown in Table 1 below.

TABLE 1

| ITEM | CONVENTIONAL 2 PASS SWRO | IO System |
|---|---|---|
| Feed (m3/d) | 50,000 | 50,000 |
| Recovery (m3/d) | 21,500 (43%) | 22,490 (45%) |
| TDS (ppm) FEED | 30,000 | 60,000 |
| TDS (Permeate) ppm | <500 | <50 |
| Footprint (m2) | Pretreatment + ERD + 2 P SWRO 3500 | Pre/t plus 3 membrane processes + draw recovery = 1850 |
| Osmotic Pressure (psi)(feed) | 330 | 660 |
| kW/m3 | 0.16 | 0.24 |
| Power (kW) | 3500 | 5300 |
| Installation cost | 45% of CAPEX | 25% of CAPEX |
| SEC (kWhr/m3) | 3.9 (w/ERD) | Case I//Case II (w/levers) 5.8 (w/partial ERD)//~4.8 |
| Construction (w/permit) | >5 years | <15 months |
| CAPEX (estimate) (w/o installation) | $1350/m3 | $780/m3 |
| Power (kW) | 3500 (w/ERD) | 5300 (w/partial ERD) |

As disclosed herein, IO contemplates a process of providing additional freshwater recovery and a decreased volume of high total dissolved solids (TDS) concentrate (or wastewater) from conventional freshwater extraction processes (hereinafter, for simplicity, referenced as reverse osmosis or RO regardless of the type of freshwater extraction technology). IO affords these benefits by effecting a staged osmotic separation process, specifically, NF with specifically developed and selected morphology and zeta potential (which may include one or more SW NF filtration structures or stages) and, optionally and as described below, a very low energy NF stage, which prefaces a FO process upon the wastewater concentrate stream of a conventional RO system. The IO process also provides a means to extract freshwater from other high TDS concentrate feed waters which are otherwise intractable by the prior art.

More specifically and as described in additional detail herein, with reference to FIG. 1, an IO system may comprise a conventional two-pass sea water reverse osmosis (SWRO) stage 100 passing through a "fence line" 101, a conditioning stage 110 where conditioning of SWRO concentrate (e.g., having a concentration of 58,000 ppm) from the SWRO stage 100 occurs, for example, to reduce calcium, and an additive stage 115 where various additives may be added to the conditioned concentrate (e.g., surface tension lowering additives, etc.).

After the additive stage 115, as described below, a selective NF stage 120 processes the conditioned SWRO concentrate to remove certain ions, with about 72% recovery rate of NF permeate, and about 23% concentrate which can proceed to a byproducts harvesting stage 160 to harvest materials which may be used in other applications (e.g., concentrated brine solution which may be used in Solvay process, soda ash, etc.).

The SW NF permeate may then, as described in more detail below, optionally pass through a very low energy NF stage 170 (VLENF or "ultrafiltration" or simply "UF") and/or a weak base anion exchange (WBA) stage 180 (e.g., bicarbonate $HCO_3$ form) to form a UF concentrate, or alternatively, may move directly to a FO stage 130. The WBA stage 180 acts as a carrier for a metallic bioenzyme toggle for $H_2CO_3$ and $H_2O$ and $CO_2$.

In the event the SW NF permeate first goes through the VLENF 170 or WBA 180 stage, the concentrate from these stages may be used in as draw solution osmolyte in the FO stage 130. The FO stage 130 may see a recovery rate of about 80%. After the FO stage 130, a final separation osmolyte stage 140 may also be employed, providing about 95% permeate recovery rate with an end use water output having less than about 150 TDS. The remaining draw solution osmolyte from the final separation stage 140 may optionally be further processed in an additional purification stage 150, if necessary.

Figure 6:
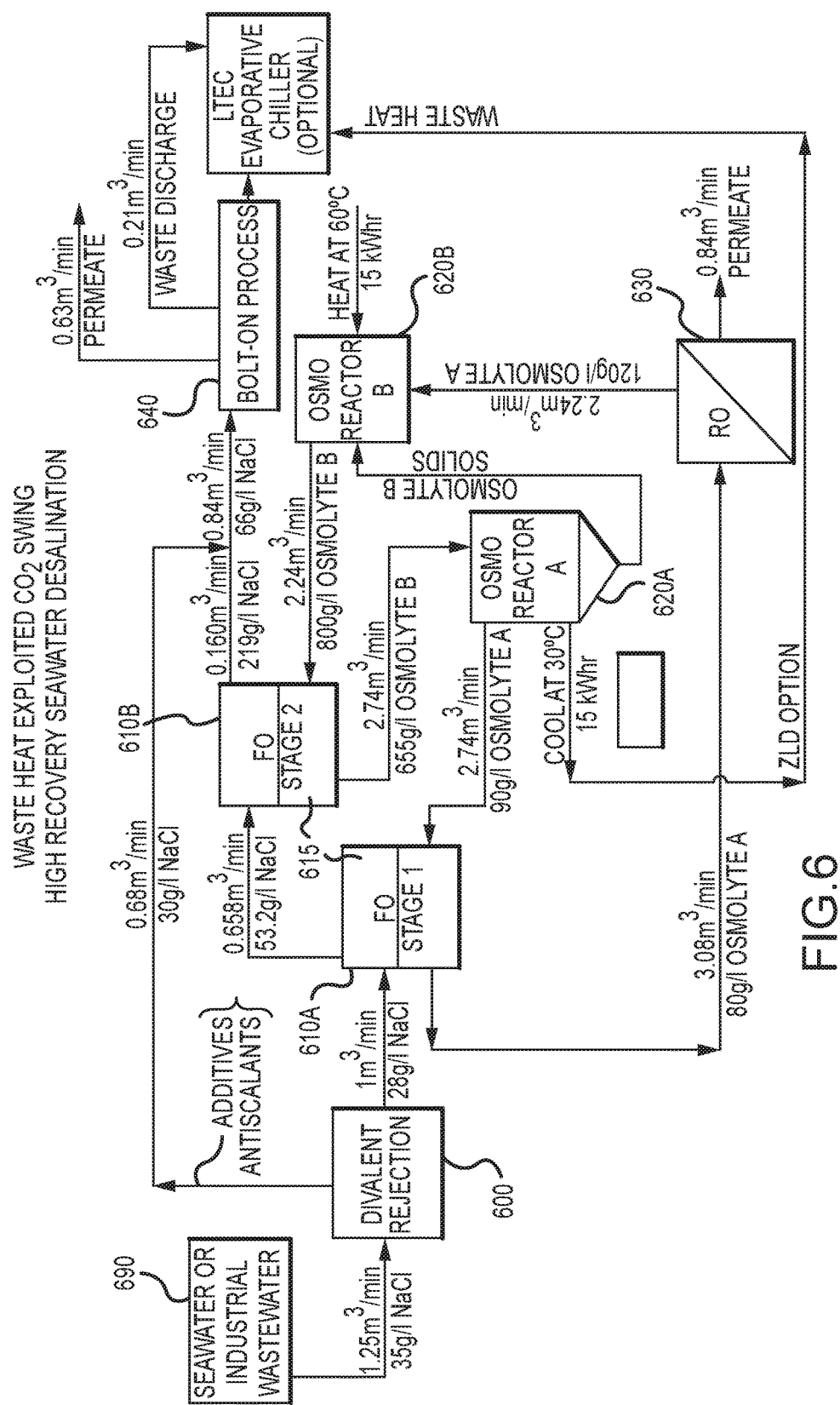
FIG. 6 illustrates a flow diagram of another embodiment of an Integrated Osmosis process.

In accordance with another embodiment of an IO system and with reference to FIG. 6, of note, the illustrated IO system does not refer to SWRO elements, high pressure pumps, a compact skid, or energy recovery equipment. Rather, the illustrated IO system uses thermodynamics of mass and heat transfer, a catalytic performance of a metallic bioenzyme, and waste heat available at the source, or other economical means (e.g., thermal fluid, DMSO and thermolytic nanoparticles). The IO system begins with seawater taken though a NF stage (SWNF), with a pretreatment goal to reach a SDI value below 3.0 and turbidity below 0.2 NTU. At this point, the feed 690 and is processed through a SW NF stage 600 to selectively reject more than 70% calcium, more than 80% magnesium, and more than 90% sulfate ions while passing as high a percent of monovalent ions as possible. A term defined as relative apparent molar enthalpy captures the value of an exotherm as a beneficial heat source as heat of dilution in kJ/mol. Multiply by total mols of DMSO or LiBr to obtain the total heat.

Commercially available SWNF membranes from GE Water and Dow (Filmtec) are exemplary membranes which may be modified and used in accordance with the present disclosure. As illustrated in FIG. 6, using two stages of FO 610A, 610B, the mass transfer of water to the draw solute is maximized. Additionally, the illustrated IO system takes advantage of an almost eight-fold difference in osmotic pressures between osmolyte A 620A, 620B, as well as factors such as permeate suction, temperature, and the like.

As those skilled in the art will appreciate, osmotic pressure is the pressure required to stop the process of osmosis. In other words, water moves down to its osmotic potential. Moreover, the influential metallic enzyme lowers the pKa of water from 15.7 to 7. FO concentrate from NF stage 610A is feed water to NF stage 610B. The higher the FO retentate, the higher the recovery yields from RO 630. By way of comparison, conventional two-pass SWRO gives a recovery of about 42% and SEC (with ERD) is about 3.8 kWh/m3. In contrast, the process illustrated by FIG. 6 shows a recovery greater than 80%.

Additionally, as described in further detail below, in accordance with the present disclosure and with reference back to FIG. 1, IO employs nanofiltration of the high TDS concentrate feedwater as a first stage, prior to any FO stages. In contrast to RO, wherein nearly all ions are removed from the feed water, the nanofiltration first stage of IO selectively removes only a certain population of ions. For example, non-monovalent (e.g., divalent, trivalent, etc.) ions are preferentially removed with minimal effects upon monovalent ions to produce a lowered osmotic pressure solution. The removal of non-monovalent ions reduces scaling tendencies promoted by bonding with sulfates, carbonates, silicates and the like. An additional benefit is removal of fine and colloidal solids.

The NF stage generates water that is essentially free of suspended solids and has a stable pH, offering a lowered osmotic pressure afforded by the reduced non-monovalent ion concentration. This water proceeds to the next stage process of IO which incorporates one or more FO stages benefitting from the reduced osmotic pressure and a negative charge provided by the earlier stage of IO. In accordance with various aspects of the present disclosure, by employing IO with concentrate produced from RO, additional freshwater recovery can be achieved, a net benefit overall.

Benefits of IO as contemplated herein include the ease of installation and "retro-fitting" to existing RO processes. In this regard, IO processes can be readily added as a "bolt-on" type configuration, affording increased freshwater production using the combined processes. Increased freshwater recovery from the combined existing RO and the NF and FO processes thus offer enhanced use of invested capital and infrastructure of the existing RO system's intake, discharge and pretreatment associated processes.

For example, in IO retro-fit cases, where an existing RO process results in a 42%/58% freshwater/concentrate split, by increasing the daily freshwater product output by 50 percent of the feed (0.51×58,000 m3/d=~30,000 m3/d) using IO, results in a about 70% increase of freshwater recovery. This mass balance also allows a complete use of all the pretreatment ultrafiltration capacity and a modular design leaves space to accommodate adding more surface area for expansion. A IO process can therefore complement the objective of adding more UF capacity (with the hardware in place) by inserting cassettes or modules with membrane area (software).

Additionally, there is a corresponding reduction in the volume and disposal cost of concentrate being discharged inland or in the ocean. In this regard, because IO affords an increase of freshwater production and a concurrent decrease of waste concentrate volume, a further benefit is the reduction of waste concentrate and associated handling and disposal costs. This benefit also provides an additional object of IO, namely, volumetric waste reduction lessens "Zero Liquid Discharge" (ZLD) processing costs rendering ZLD environmental and/or regulatory goals more affordable (see for example, FIG. 6). Moreover, if the waste concentrate TDS level can be elevated to a high enough level (e.g., 230,000), there is no need to a crystallizing step or related apparatus, and rather, all that is needed is an evaporator, saving further capital cost.

Further still, licensing and permits for incremental expansion of existing RO systems may be straightforward and less cumbersome to obtain and implement, thereby bringing additional capacity on-line in less time. Additionally, IO generally does not require additional expensive, long lead time, high pressure SWRO pumps.

Moreover, IO provides a higher and more efficient utilization of the treated feed water of an existing RO system, and higher salts content in the concentrate provide additional options for valuable by-product salt or mineral extraction, which may also be capable of reuse in the IO process itself. Examples of such by-products include concentrated, very high purity (>99%) brine which may be usable as feedstock for Solvay processes. The same may also provide flexibility to convert various nanofiltration concentrates into sodium sulfate as a draw solution (osmolyte) for FO processes.

Additionally, in the United States for example, inland desalination would be a much needed and appreciated pathway for treating brackish water (3,000 ppm to 12,000 ppm TDS) were it not for the prohibitive concentrate disposal cost. Depending on the mode of disposal, this cost can vary from about $3.5 MM per MGD to $12 MM per MGD. Estimates put these high TDS water/s in the state of Texas alone at about 2.5 billion acre feet or about 830 trillion gallons. As such, an IO process such as disclosed herein, offers the potential of affordability for use of this water as a source for potable and industrial needs.

Additionally as discussed in more detail herein, in regions or water bodies where the threat of habitual algae toxins (HAB) puts the entire desalination system in a total shut down mode or operate with a risk of severe fouling of SWRO membranes, an IO system such as disclosed herein, if installed with a disc filtration system like the INTEGRA® system consisting of discs ranging in micron size from 200 microns to 2 microns with discs made of a blend of robust plastics along with the dissolved air filtration (DAF) system from the original SWRO system can be programmed to work congruently to prepare the feed for the IO system.

Thus, in times of HAB, if the decision is made to operate the SWRO system due to need and no alternate resource of drinking water nearby, then the SW feed is taken past the intake screen infrastructure, then the DAF system, then through the INTEGRA® disc filtration system and then through the IO system (by-passing the two-pass SWRO system).

Additionally, seawater NF has zwitterionic properties. Therefore, lowering the pH to the iso-electric point and changing the zeta potential from minus (15 mV to 25 mV) to neutral, along with addition of a food grade humectant bacteriostat, plus permeate suction, prevents buildup of a concentration polarization gradient adjacent to the NF membrane skin layer.

In various embodiments, the FO membrane may have a contact angle below 60 degrees and the substrate osmolyte draw solution can be blended to keep the substrate continually moist, thus minimizing bacterial accumulation on the membrane skin layer. Operating levers like osmotic backwash, permeate suction, and keeping the draw cross velocity higher than the feed velocity (net CFV or cross flow velocity) can also minimize biofouling or HAB accumulation.

Those skilled in the art will appreciate that FO has many characteristics that are similar to RO, including fouling or plugging from suspended solids (TSS-total suspended solids), osmotic pressure effects exerted by dissolved solids (TDS), bacterial contamination and associated bio-fouling, contamination and fouling by natural organic materials (NOM) as well as fouling from oil and grease. In contrast to RO, these characteristics and associated difficulties effect and interact with both the feed water and the draw solution sides of forward osmosis membranes burdening FO with additional and unique characteristics and difficulties. Thus, until the present disclosure, FO was oft-ignored by those skilled in the art.

Figure 2:
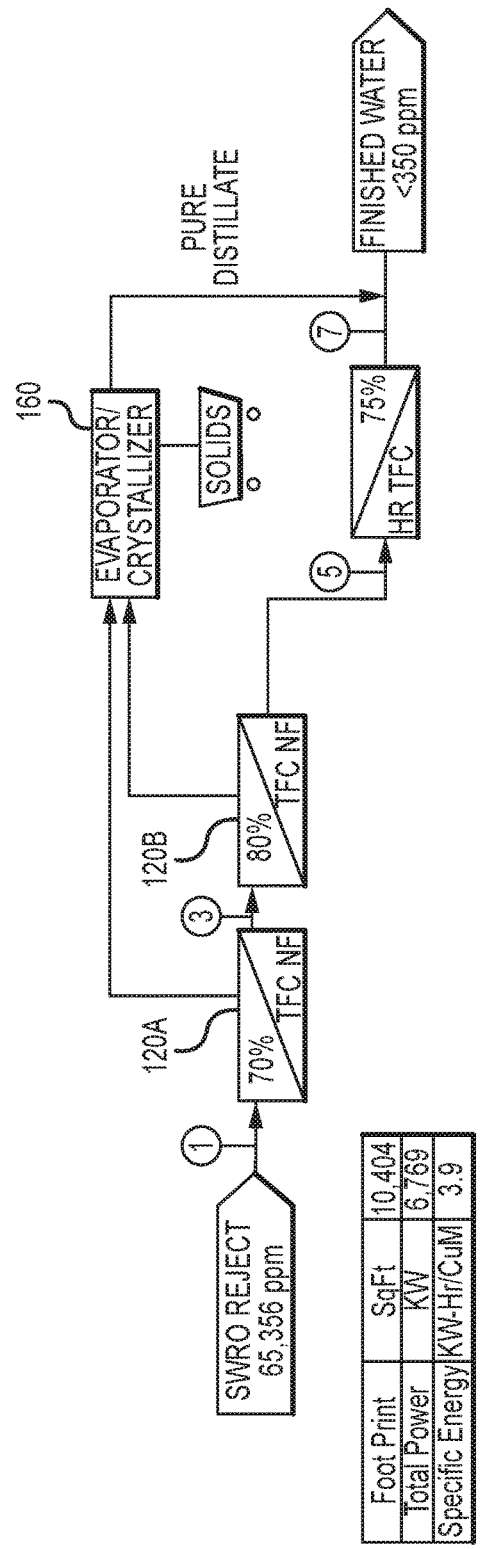
FIG. 2 illustrates a flow diagram of an Integrated Osmosis process including two-stage NF.
Figure 3:
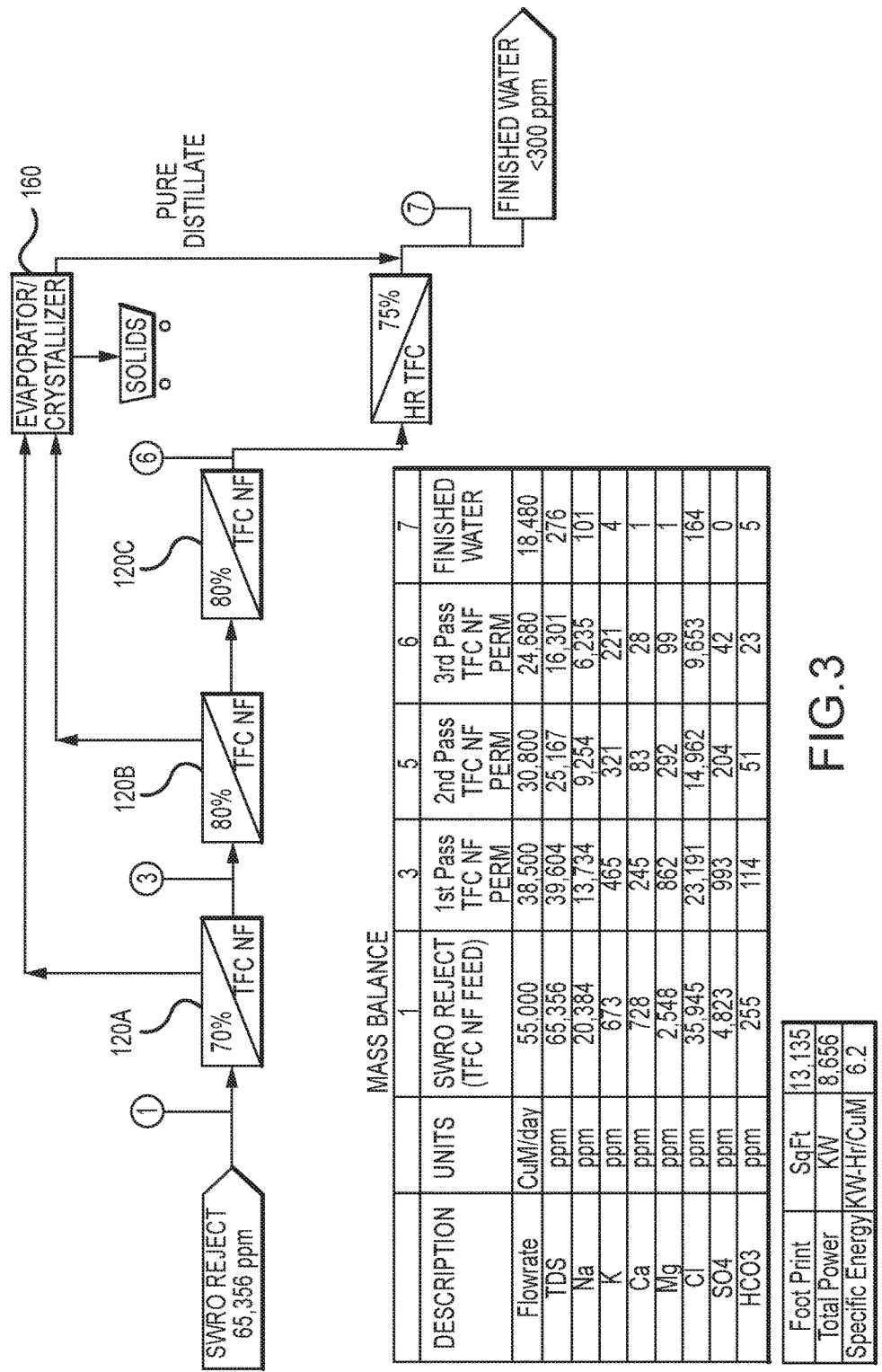
FIG. 3 illustrates a flow diagram of an Integrated Osmosis process including three-stage NF.

In this regard, IO is novel and counterintuitive in that it uses NF before UF and FO. By operating the NF process in a 2×1 array (see FIG. 2 for example) with the first array consisting of a hydrophilic NF membrane operating at a pH of 3.0 to 3.5, calcium removal can be maximized. The second array can operate at a pH above the iso-electric point to maximize rejection of sulfate ion and magnesium ion. Additional NF membranes may be added to the IO system as desired. For example, FIG. 3 illustrates a three-stage NF process.

By having a NF step before the FO step, the skin layer roughness and the cross linkage of the amide group relative to the linear pendant carboxylic acid groups can be maximized. This is beneficial in that increasing the amide linkage also increases hydrogen bonding sites and thus, osmotic permeability of water molecules through the FO membrane is accelerated, capitalizing on this feature of the FO membrane, namely, that it has the best mass transfer of water facilitated by the performance of the NF membrane rejecting divalent ions, suspended solids, NOM and biofoulants.

By focusing the NF step more exclusively on rejecting a large percentage of non-monovalent ions and sub-micron suspended solids, the NF membrane will pass monovalent ions, operate at moderate hydraulic pressure, and reduce the osmotic pressure on feed side of the FO process. Thus, NF recovery can reach a range of about 75% to about 80%, and importantly, removal of calcium by NF allows raising the molar concentration or TDS driven osmotic pressure of the draw solution in FO and allows FO to operate at high recovery rates, often greater than about 70%, and approaching about 80%. A result from FO is thus a maximizing of the mass transfer of water from the feed side to the draw side in a relatively more compact footprint.

In various embodiments, the use of "operating levers" available can help facilitate, catalyze, humectize, reduce surface tension reduction, turbulence promoters, thermal enablers to accelerate transport phenomena and water transport. While this can increase operating expenses, because of the increases in recovery and other benefits noted above, including the reduction of footprint and capital expenditures of forward osmosis, the returns are significant.

In accordance with various aspects of the present disclosure, both NF and FO elements can be manufactured in a "full fit" construction (no fiber glass exterior and no brine seal) for efficient osmosis. Urethane glue can be applied in a "W" pattern in spiral wound FO elements thereby improving robustness and increasing available surface area. Additionally, the layout of the FO elements may be placed in a parallel design (longitudinally) wherein each element is encased in its own cartridge housing providing increased cleanliness and economy, as well as the capability to maintain a substantially constant difference in pressure on feed and draw sides, allowing more uniform flux.

In accordance with various embodiments, varying blends of different draw solutions/osmolytes may enable operating FO in either an active layer facing feed (AL FS), solution diffusion first, convection second mode when the draw solution or osmolyte is mostly inorganic, or an acting layer facing draw (AL DS), convection first, solution diffusion second mode when the osmolyte is mostly organic.

As noted above, in accordance with various aspects of the present disclosure, IO may use a metallic bioenzyme that provides a basis for deprotonation of water by lowering the pKa of water from 15.7 to 7. By virtue of this decrease, more water molecules are available to deprotonate at a lower pH to turn into hydroxyl ion, a better nucleophile.

Figure 7:
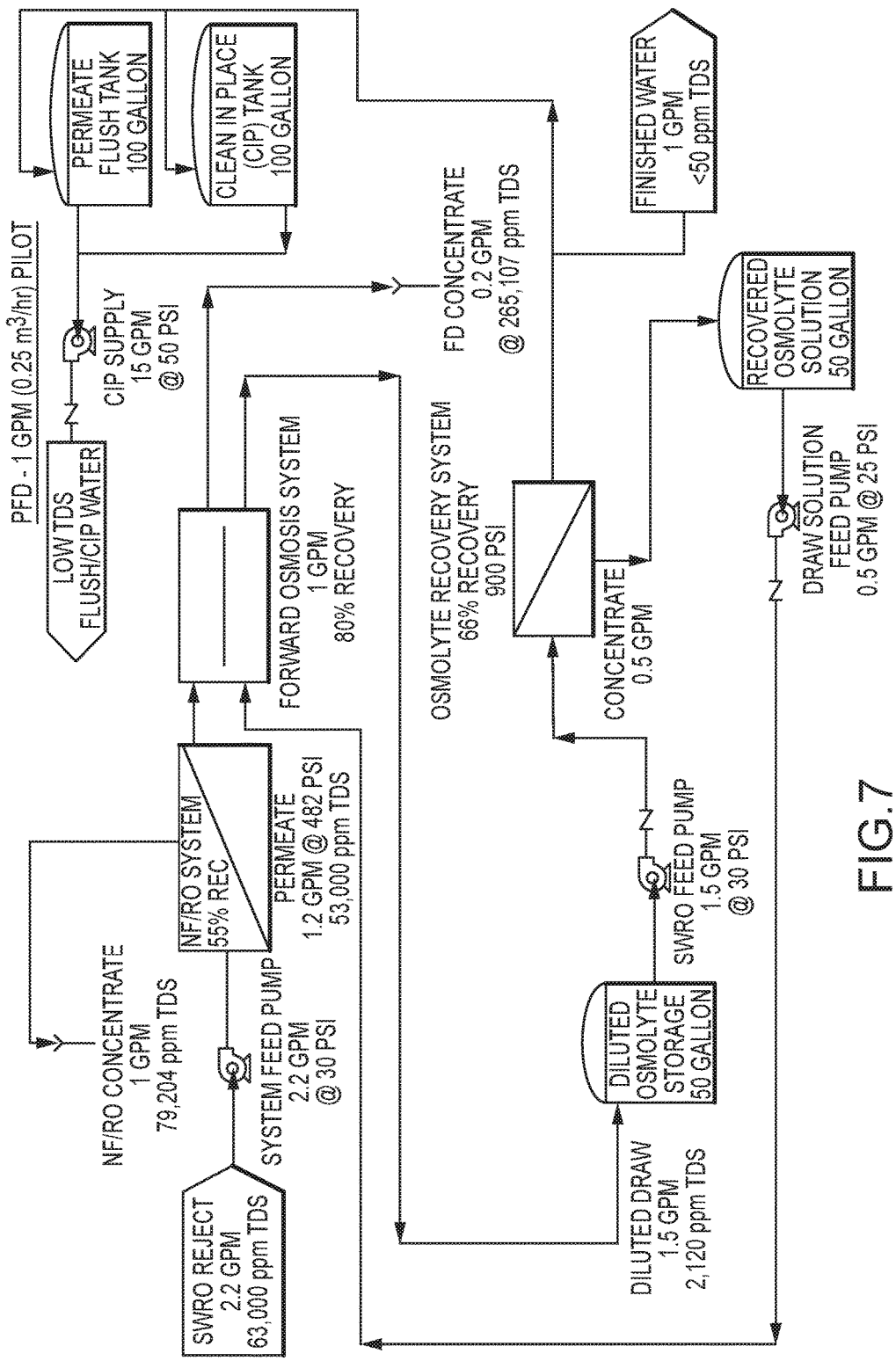
FIG. 7 illustrates a flow diagram of a validation of a pilot demonstration using an Integrated Osmosis as contemplated herein.

With reference briefly to FIG. 7, illustrating a flow diagram of a validation of a pilot demonstration using an Integrated Osmosis system as contemplated herein. The scalability of the pilot demonstration of 1440 gpd is about 500:1—can go up to as 750,000 gpd.

Exemplary Integrated Osmosis Systems

Step One

In accordance with various aspects of the present disclosure and with reference back to FIG. 1, a first step of IO includes conditioning and pre-treatment 110 of the initial feed water (e.g., high salinity seawater concentrate) from a conventional two-pass RO process 100. A conventional two-pass SWRO has a feed salinity of about 33,000 ppm, a permeate TDS of about 250 ppm and has a recovery rate of about 42% with about 3.9 SEC kWhr/m$^3$. For IO, the feed salinity is about 65,000 ppm, permeate TDS is less than about 100 ppm and has a recovery rate of about 51% with about 5.8 SEC kWhr/m$^3$.

While the composition of TDS in a SWRO concentrate is generally consistent throughout the year, frequent analysis of residuals in the concentrate like antiscalant degradation products, biocides, NOM and recently reported *Leucothrix mucor* and *Rugeria* species is desirable. For example, analysis of a typical seawater concentrate sample is as follows:

| | |
|---|---|
| TDS = | 65,356 ppm |
| Na = | 20,384 ppm |
| K = | 673 ppm |

-continued

| | |
|---|---|
| Ca = | 980 ppm |
| Mg = | 2548 ppm |
| Cl = | 35945 |
| SO$_4$ = | 4823 ppm |
| pH = | ~6.8 |

Dependent upon the point of discharge of the concentrate and the re-entry as feed to an Integrated Osmosis process, there may be a presence of iron, bio-available manganese (for example, as high as 230 ppb in the Indian Ocean) to form ferromanganese blooms, dissolved organic matter, TEP (total exopolysaccharides) and algae. As such, pre-treatment 110 may be important.

As noted above, calcium is addressed first because of the potential difficulty of calcium complexing with NOM and the potential of calcium sulphate precipitation dependent upon the state of calcium (e.g., dehydrate, hemihydrates and anhydrite) and temperature. Solubility of CaSO$_4$ @ 0.015% molal is the highest at 30° C. Thus, a chelating compound is used to bind calcium and trace levels (e.g., ppb) of ferromanganese bio foulants. Exemplary chelating agents include, Ethylenediaminetetraacetic acid (EDTA) and Nitrilotriacetic acid (NTA) though others may likewise be used. For example, alternate "green compounds" such as the tetra sodium salt of glutamic acid/N,N diacetic acid (Dissolvine GL 36) may be preferable.

Additionally, during "red tide" season (or HABs, as noted above), suspended fine solids, red algae, algal cells (10µ to 15µ), Bacteria (1µ to 2µ), AOM (algogenic organic matter) and particulate matter (<0.45µ) can become ubiquitous. Thus, an effective (and often inexpensive) adsorbent bed of hydrophilic polysulfone with Chitosan and Cloisite A 30 B media installed. This bed has a nominal pore size of about 3 microns. Following this bed, an INTEGRA disc filter system (high surface area and 26,000 linear feet depth per module) alongside a Smart Sponge Plus to provide adequate residence time or EBRT (empty bed retention time) to yield an effluent with SDI below 2.5 and turbidity below 0.2 NTU. Additionally, these disc filters can be backwashed and are made of oleo phobic and hydrophilic engineered polymers. Additionally (or alternatively), in various embodiments, to minimize calcium sulfate dehydrate scaling, a 1:1 ratio of a blend of two antiscalants, for example, polyacrylic acid and polyether polyaminophosphonic acid can provide about 80% inhibition of Calcium scaling.

Additional food safe additives, surfactants, and the like, may be added to the pretreated SWRO concentrate in stage 111 to lower surface tension and to end cap the unreacted monomers in order to minimize reverse salt flux or theft of 'A' value of a FO membrane from unreacted amine leaking through. By using a super spreader surfactant (e.g., siloxane polyalkyleneoxide such as Silwet® 77 or Silwet® 78) an improvement in the FO membrane's hydrolytic stability vs. pH can be obtained. Additionally, a lower amount of surfactant, namely about 0.15 wt. % instead of the more conventional 2.0 wt. %) required results in an even, homogeneous spread across the width of the membrane flat sheet in manufacturing.

Step Two

In accordance with various aspects of the present disclosure and with reference to FIGS. 1, 2, 3 and 6, a second step of IO includes NF 120 of high salinity seawater concentrate. NF covers the bandwidth between about 15° A to about 115° A and typically operates in a pressure range of about 40 psig to about 200 psig (in SW SR applications).

In various embodiments, the non-monovalent ions are organic molecules with competitive osmotic pressure. In other embodiments, the non-monovalent ions are positively charged inorganic molecules. As mentioned above, in various embodiments, NF rejects non-monovalent ions such as sulfate, calcium and magnesium, and can also reject micron-sized suspended matter such that a very high percent of monovalent ions pass through to the FO process. Removal of non-monovalent ions proceeds at a slower diffusion rate, resulting in a lower molar flux. However, the FO membrane is advantaged because the feed is homogeneous, accelerating the mass transfer of water.

For example, rates of greater than about 95% rejection of sulfate, greater than about 85% rejection of calcium and Magnesium can be obtained. Single stage (FIG. 1), two stage (FIG. 2), three stage (FIG. 3) or more NF membranes may be used. An exemplary NF membrane is manufactured by GE WATER, and is known as SWSR 400 (400 square feet area). Those skilled in the art will recognize that other NF membranes may also be used and still fall within the scope of the present disclosure.

By using NF before FO, numerous benefits may be achieved. For example, the hydrated ionic radii of divalent ions diffuse slowly across the membrane skin layer interface resulting in a lower molar flux, proceeding at a rate to maintain electro neutrality. For example, hydrated ionic diameter of Magnesium is 16° A while Potassium is 6° A. Additionally, a lower TDS feed to FO means lower osmotic pressure. The NF rejection of any trace turbidity in the feed, gives flexibility in construction of the spiral wound FO element with respect to spacer thickness and permeate tricot fabric. Moreover, permeate from NF has a negative zeta potential as it approaches the FO boundary layer. This will catalyze higher rejection of monovalent ions and lower reverse salt flux. Further, the reject from NF can easily be converted to sodium sulfate (Na$_2$SO$_4$), giving a good osmolyte or draw solution at an economical and environmentally responsible cost.

Additionally, when the feed to the FO process is mostly monovalent ions and the draw solution is non-monovalent, the reverse salt diffusion is lower than the vice versa condition. Because the osmotic pressure "load" in a NF membrane is primarily divalent and under 325 psi, a pathway is cleared to build the NF elements in a non-fiber reinforced polyester (FRP) full fit construction without a brine seal. A further benefit is a lower pressure drop per element, a higher cross flow velocity, no biofilm growth and more room to pack more surface area.

In various embodiments, permeate suction may be applied to keep the boundary layer destabilized and decrease concentration polarization, while at the same time increasing the mass transfer coefficient. The role of permeate suction in mass transfer through porous membranes is important as it enhances mass transfer from the bulk to the membrane surface. By applying suction at the end of the collector tube of the membrane module, an increased rate of pressure will be present. This ill destabilize the boundary layer at steady state conditions. Permeate suction changes the solutions physical properties, such as viscosity, density and diffusivity—all functions of concentration.

Step Three

In accordance with various aspects of the present disclosure and with reference to FIG. 1, an optional third step of IO may include UF stage 170 and/or WBA 180 of the NF permeate. For example, permeate from NF as described herein may have more than 12,000 ppm of sodium and even more chloride. By installing a UF membrane with 0.5 nm pores and with sodium dodecyl benzene sulfonate adsorbed on the membrane, sodium complexed with chloride will show rejection up to about 50% at a maximum loading of 0.05 mmols/gram while sodium complexed with sulfate shows a rejection of about 75%. As noted above, a WBA stage 180 acts as a carrier for a metallic bioenzyme toggle for $H_2Co_3$ and $H_2O$ and $CO_2$.

Step Four

Figure 4B:
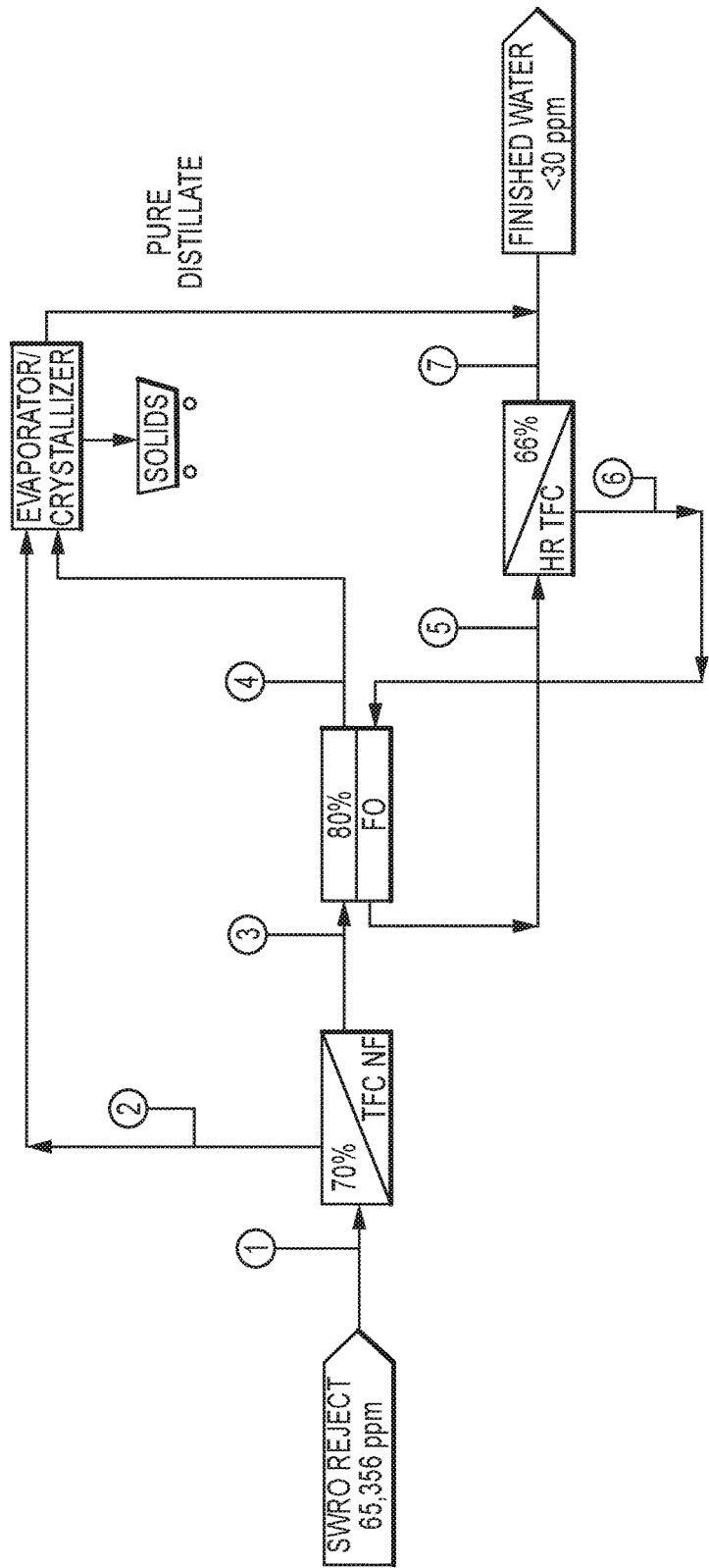
FIG. 4B illustrates a flow diagram of another embodiment of an Integrated Osmosis process.

In accordance with various aspects of the present disclosure and with continued reference to FIGS. 1, 4, and 6, a fourth step of IO includes a FO stage 130/140/615A/615B. In the presently described example, SWRO concentrate going through the IO system as a feed to the NF step has a TDS of about 66,000 ppm. The SWNF permeate has a TDS of about 40,000 ppm as a feed to advanced UF step. The UF permeate has a TDS of about 30,000 ppm and is fed to the FO step. At the FO stage 130, with a feed of about 30,000 ppm, the osmotic pressure will be about 300 psi.

Figure 5:
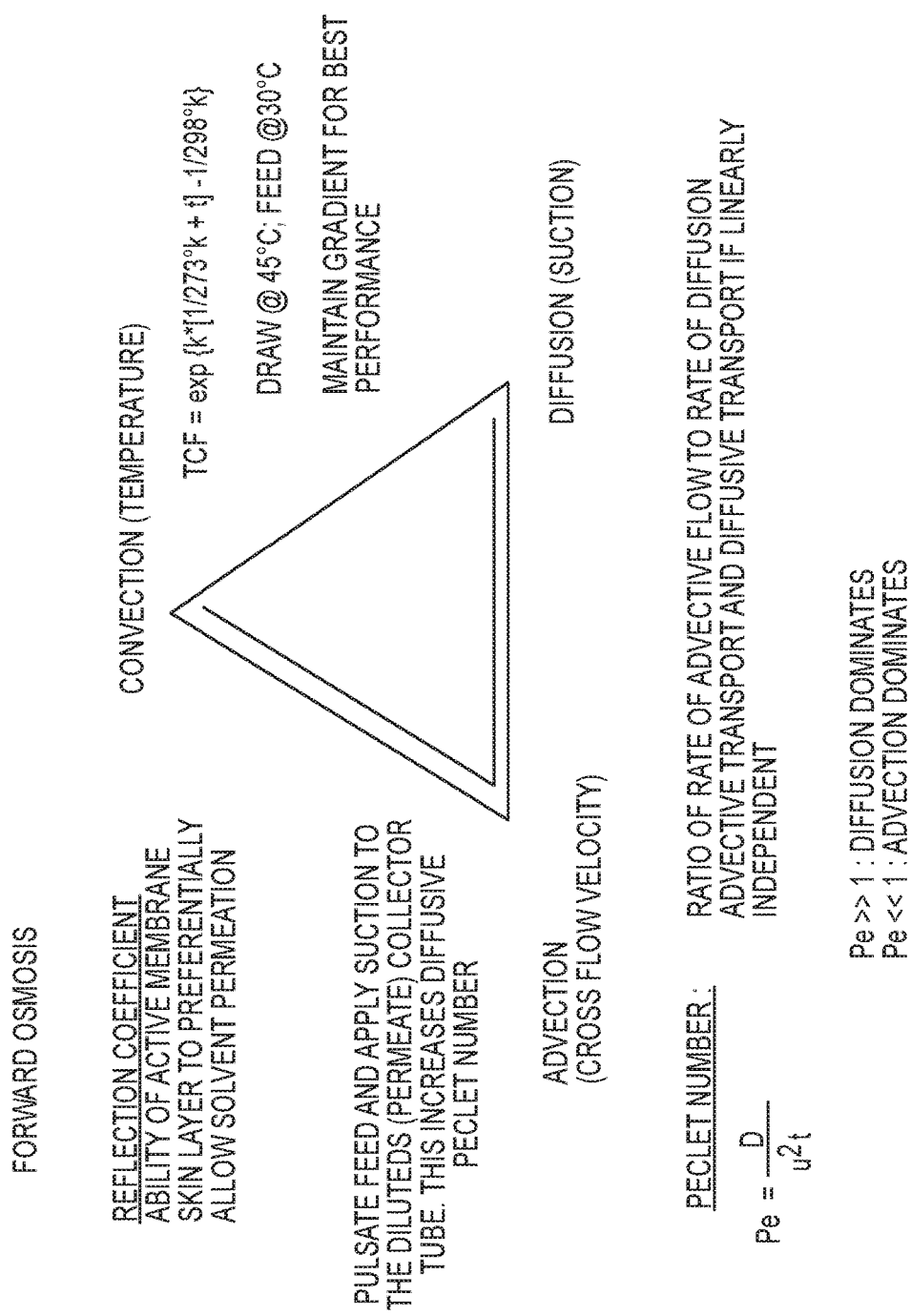
FIG. 5 illustrates the relationship between advection (cross-flow velocity), convection (temperature), and diffusion (suction) is shown.

Briefly, with reference specifically to FIG. 5, the relationship between advection (cross-flow velocity), convection (temperature), and diffusion (suction) is shown. Of note, the flux of a draw solution solute through a support layer in a FO membrane is equal to the sum of diffusive and convective components of flux. When the feed concentration is greater than about 0.5 M, more permeate suction may be applied to improve diffusivity. If temperature is raised, this may mitigate some effects of dilute internal concentration polarization gradient (DICP). With respect to FO membranes, the boundary layer thickness is inversely proportional to the square root of the Peclet number.

In an embodiment, an exemplary guideline for a balanced operation of a FO system with feed side concentration below 0.5 M (about 29,000 ppm TDS) is as follows:

1. Feed and draw are countercurrent.
2. In a thin film composite polyamide FO membrane, the CFV of draw is higher than the CFV of the feed. (e.g. 25 cm/sec to 15 cm)
3. The draw solution concentration should be between 2× to 3× of the feed concentration.
4. Take advantage of heating the draw solution to 45° C. and also keep the feed at a constant temperature to avoid temporal variation and its impact on flux.
5. Situating the FO elements longitudinally in individual cartridges in a full fit design offers the ability to maintain a constant gap or gradient between the feed and the draw. In a conventional latitudinal arrangement of FO elements in a PV, the FO feed gets more concentrated while the DS moving in opposite direction is picking up more water, becoming more dilute and thereby decreasing the gap or gradient between the feed and the draw. When this happens, less water is drawn from the feed side, counter to the objective of FO.
6. Osmotic backwash and permeate suction help assure consistent performance of the FO system.
7. High ionic strength DS may de-swell a cellulose triacetate FO membrane via charge neutralization which results in lower water permeability and higher salt passage and lower structural parameter. This trend may be exacerbated by the presence of divalent cations which tend to swell the polymer. Though de-swelling is not as much of an issue in membranes made by interfacial polymerization, this is another reason to put SW NF before FO.
8. De-swelling at high osmotic pressures leads to osmotic dehydration.
9. In the AL FS mode, the DS penetrates the porous support layer to the interior surface of the active layer before flux can occur.

Preferably, FO elements are shipped wet from the manufacturer in a preservative such as PEG400. In various embodiments, IO the FO stage 130 may comprise a FO thin film composite membrane optimized for particular performance characteristics, such as maximizing the mass transfer of water from the polyamide skin layer to the substrate by allowing a two phase flow or simply bubbling high quality carbon dioxide gas through the feed solution.

The FO membrane may be a carrier for a metallic bioenzyme which is very fast and efficient in catalyzing formation of $H_2CO_3$ or carbonic acid and liberation of protons ($H_2O+CO_2 \leftarrow\rightarrow H+HCO_3$). By manipulating the zeta potential, the membrane is maintained as the transporter.

The FO membrane may have a backing. For example, in an embodiment, the backing may be a tricot material, similar to what may be used to make a permeate channel tricot in spiral wound NF and RO membranes. Alternately, a woven 2.7 mils thick, 70 microns in thickness may be used.

The FO may also have a substrate. Because cyclic dimer is an impurity and can makes a solution cloudy, low cyclic dimer (LCD<1.5 wt. %) grade of polysulfone may be included with a desiccant to assure no humidity or moisture enters the holding tank where polysulfone/solvent are kept before deposition on the casting line (phase inversion process). Additionally, 5 micron and 1 micron cartridge filters may be provided to filter the polysulfone dope before deposition on the web. To obtain a narrower pore size distribution with high pore density and smaller interconnected pores, a hydrophobic surfactant may be added to the polysulfone dope before phase inversion and keep the coagulation tank temperature at 5° C.

An effective FO membrane facilitates active mass transfer of water from the thin film composite layer to the UF substrate. This active role collaborates with the draw solution for an optimal mass transfer of water. This is achieved by maximizing the population of network pores (1 Angstrom to 5 Angstroms) in the membrane skin layer and by using a super hydrophilic surfactant in the feed. Residual acid chloride groups catalyze breakdown of amide functionality as H+ ion availability is reduced. While it is common practice in interfacial polymerization process for brackish water RO membranes to use as much as 6 wt. % mPD (amine), the optimal amount for FO membrane is 2 wt. %. Using analytical tools such as positive annihilation lifetime spectroscopy (PALS) and quasi elastic neutron scattering (QENS), it is known that the aggregate pores and network pores can have a variety of pore structures. The dynamics of movement of water in the polymeric membrane is best described as jump diffusion.

In accordance with various embodiments, the functionality of IO, and specifically the FO stages of IO, is illustrated in Table 2 below, comparing the functionality and the relative importance, and ranking the same:

TABLE 2

| Functionality/Operating Vector | Relative Importance to Performance | Overall Non-Quantitative Ranking |
|---|---|---|
| Sequence of placement of membranes in the flow sheet/membrane skin layer, bimodal ratio of network pores to aggregate pores, | High | 1 |

TABLE 2-continued

| Functionality/Operating Vector | Relative Importance to Performance | Overall Non-Quantitative Ranking |
|---|---|---|
| rugosity, substrate porosity and lubricity, interconnectivity of pores | | |
| Productivity per unit measure (e.g., flux/rejection, RSF, SEC, etc.) | High | 6 |
| Homogeneity of feed FO -- % monovalent ions/TDS, end capping of reacted moieties on polyamide skin layer | High | 3 |
| Wettability of the membrane and the substrate, cross flow velocity of feed draw solution | Medium | 7 |
| Contact angle and hydrophilicity of spiral element/efficiency of NF and FO spirals/series or parallel feed | Medium | 8 |
| DS or Osmolyte recovery and purity of permeate, reflection coefficient, CFV | High | 5 |
| Operating levers such as temperature, Peclet number, permeate suction, choice of osmolyte (application specific) | High | 4 |
| Diffusivity impacted by the surface properties at the top of the pore structure while osmotic permeability is influenced by the contact angle | High | 2 |

Thermal Benefits of FO

Mass transfer of water through FO membranes is moderated by diffusion, particularly on the draw solution side of the FO membrane. Osmolyte diffusion toward the reject layer of the membrane generates the osmotic pressure gradient necessary for mass transfer. Diffusion may influenced by many factors or variables, temperature typically being the most significant and direct influencer. Complementing this variable is the stability of thin film composite polyamide and to a degree, cellulose tri acetate membrane and element morphology. The increase in permeability and flux when temperature is increased is notable. For example, flux increases by almost 40% when the temperature rises from 20° C. to 40° C. However, the cost of energy should be considered when analyzing the cost/benefit analysis of the thermal benefits. Additionally, the advent and successful development of nanofluids as an enabling and increasing the efficiency of heat transfer medium may change the economic calculations of operating costs of FO. For example, nanofluids such as aluminum oxide and titanium dioxide are excellent choices as enablers for heat transfer, with titanium dioxide better than aluminum Oxide.

Step Five

In accordance with various aspects of the present disclosure and with reference to FIGS. 1 and 6, a fifth step of IO includes separating a draw solution (osmolyte) in a final separation stage 160. In the presently described embodiment, a dilute draw solution (mixture of inorganic salt) or osmolyte mixture is rejected by a high rugosity, high porosity, 0.5 nm pore size membrane, such as FILMTEC NF 90. Typical rejection is more than 99.5%. Additionally, to obtain additional rejection at low energy, a surfactant (e.g. sodium dodecile benzene sulfonate) charged UF (about 3 nm pore size) membrane at critical micelle concentration (CMC) may be used for rejecting sodium.

IO processes as contemplated herein provide incentives to various public interest groups and private sectors working towards the goal of achieving zero liquid discharge for a cleaner environment. In this regard, the applicability of IO processes cover a wide bandwidth of waste waters with suspended and dissolved solids as well as other organic contaminants. For example, current practice globally is to re-inject the concentrate at twice the feed salinity back into the ocean. However, numerous studies done by various research groups show the adverse impact higher salinities have on marine life.

Figure 8:
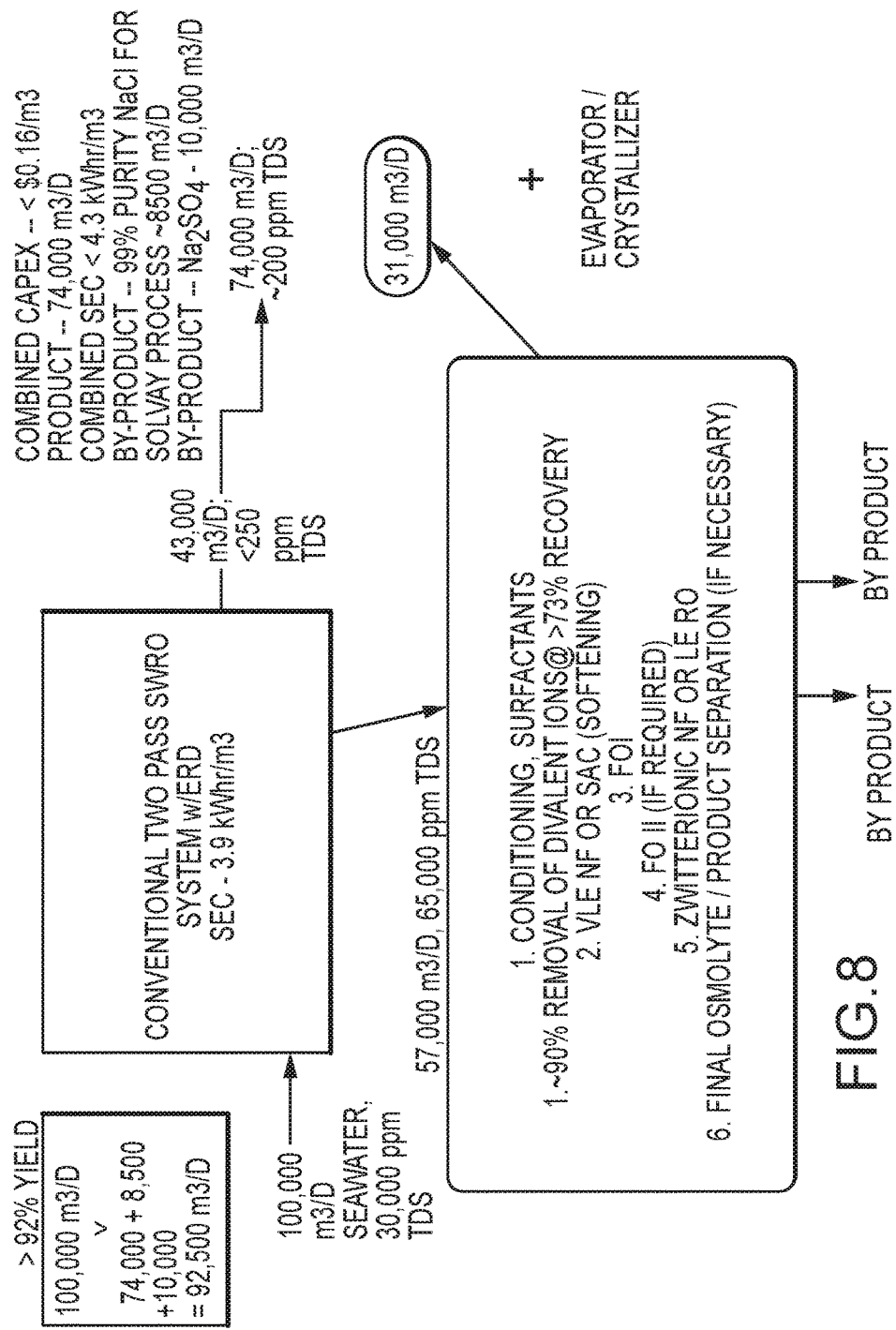
FIG. 8 illustrates a flow diagram of an Integrated Osmosis process showing various outputs and benefits of the process.

As such, in accordance with various aspects of the present disclosure and with reference to FIG. 8, an example from a seawater desalination process using reverse osmosis membranes is illustrated, addressing some of these impacts. In sum, the IO process accomplishes the following results:

1. Reduces the volume of water—by increasing the TDS in SWRO concentrate to a TDS range of 180,000 ppm to 230,000 ppm, the net volume to be handled by an evaporator and crystallizer stay small in size and affordable.
2. Little or no concentrate needs to go back in the ocean.
3. Significantly reduces the total cost of sea water disposal of the concentrate.
4. Reduces carbon footprint.
5. If by-products do find their niche application (like brine) for most of the year, this further reduces waste.
6. $Na_2SO_4$ can also be made as a byproduct from the NF concentrate.

Last, the foregoing disclosure is illustrative of the present disclosure and is not to be construed as limiting the disclosure. Although several embodiments of the disclosure have been described, persons of ordinary skill in the art will readily appreciate that numerous modifications could be made without departing from the scope and spirit of the disclosure. As such, it should be understood that all such modifications are intended to be included within the scope of this disclosure. The written description and drawings illustrate the present disclosure, and are not to be construed as limited to the specific embodiments disclosed.

We claim:

1. An Integrated Osmosis water treatment method comprising the steps of:
   providing a two pass RO high TDS concentrate feed from an RO stage having greater than about 60,000 ppm salinity;
   nanofiltering the two pass RO high TDS concentrate feed to selectively remove non-monovalent ions from the two pass RO high TDS concentrate feed to produce a lowered osmotic pressure solution; and
   passing the lowered osmotic pressure solution through at least one FO stage having at least one membrane while maintaining the lowered osmotic pressure solution at a constant temperature to avoid temporal variation and corresponding impact on flux, and also feeding a draw solution to the FO stage such that the temperature of the membrane rises to about 40-45° C., to produce a fresh water permeate.

2. The method of claim 1, further comprising the step of passing the lowered osmotic pressure solution through a UF stage prior to the FO stage.

3. The method of claim 2, further comprising the step of providing a UF concentrate from the UF stage as the draw solution in the FO stage.

4. The method in claim 1, wherein the non-monovalent ions are positively charged inorganic molecules.

5. The method in claim 1, further comprising the step of adding a super spreader surfactant to an FO membrane in the at least one FO stage.

6. The method of claim 1, further comprising an addition of at least one nanofluid in the at least one FO stage to increase an efficiency of heat transfer between the lowered osmotic pressure solution and an FO draw solution.

7. The method of claim 6, wherein the at least one nanofluid comprises at least one of aluminum oxide and titanium dioxide.

8. The method of claim 1, wherein the FO stage is operated as an active layer facing feed and an FO draw solution is mostly inorganic.

9. The method of claim 1, wherein the FO stage is operated as an acting layer facing draw and an FO draw solution is mostly organic.

10. The method of claim 1, further comprising a spiral wound FO element having a full fit design without a brine seal.

11. The method of claim 10, wherein the spiral wound FO element further comprises W shaped glue lines.

12. The method of claim 10, further comprising a longitudinally arranged spiral wound FO elements in individual cartridges, and wherein the feed solution flows north to south and the dilute FO draw solution suction flows south to north to maintain a constant A value.

* * * * *